July 29, 1958          H. L. LOGAN          2,845,579
FREQUENCY METER

Filed Jan. 19, 1955          3 Sheets-Sheet 1

INVENTOR
Hugh L. Logan.
BY
K. G. Doub
ATTORNEY

July 29, 1958     H. L. LOGAN     2,845,579
FREQUENCY METER

Filed Jan. 19, 1955     3 Sheets-Sheet 3

INVENTOR
Hugh L. Logan.
BY K. G. Doub
ATTORNEY

United States Patent Office 2,845,579
Patented July 29, 1958

2,845,579

FREQUENCY METER

Hugh L. Logan, Timonium, Md., assignor to Bendix Aviation Corporation, Baltimore, Md., a corporation of Delaware Application January 19, 1955, Serial No. 482,739

7 Claims. (Cl. 315—183)

This invention relates to frequency meters of that type adapted to generate output signal pulses of uniform amplitude and duration but of the same frequency as that of the incoming signals, the said output pulses being summed in an integrator circuit to produce a direct-current potential proportionate to the frequency of said incoming signals. This direct-current voltage may then be utilized for any purpose where applicable; for example, it may be fed into an electrical recording circuit functioning to position a printing stylus on a record chart for visually indicating frequency values.

One of the incentives which gave rise to the current invention was a desire to improve on that type of frequency meter circuit wherein a pulse-forming line is charged through a resistor from a regulated power supply and then discharged through a second resistor by means of a thyratron tube, in response to an input signal pulse on the control grid of the thyratron. With the proper choice of components, a pulse will appear across the second resistor each time the line is discharged, the successive pulses being summed in an integrating filter circuit to produce a direct-current to be utilized in the positioning of a recording stylus in direct relation to the input signal. In a frequency meter of this type, certain limitations exist which restrict the magnitude of the output signal. As a result, considerable care has to be exercised in selecting certain components of the circuitry in order to properly utilize the signal. To briefly explain some of the limitations: (a) The pulse-forming line is required to discharge, to within predetermined tolerances, an equal amount of energy during each cycle. Thus, as the line receives its charge through the first resistor during the portion of the cycle between pulses, and because the line is charged in a logarithmic fashion and the duration between pulses varies with frequency, sufficient time must always elapse for the difference in the accumulated charges between the maximum and minimum frequencies of the incoming signals to be within the predetermined tolerances. Therefore, the values of the resistor and the components of the line will be restricted by such requirement which will in turn restrict the width of the output pulse. As will hereinafter become apparent, these values must meet other conditions. (b) The characteristic impedance of the line and the value of the second resistor must be so related that a negative overshoot occurs in the output pulse to permit the thyratron tube to deionize at the end of each discharging cycle. (c) The value of the first resistor must be sufficiently large to restrict the power supply current flow at the end of the pulse so that the negative overshoot will become effective to deionize the thyratron tube.

The present invention provides a frequency meter capable of producing an output signal of relatively great amplitude without the above-noted restrictions, and because of the increased output and the elimination of such restrictions, the system in which the meter is ultimately incorporated may be simplified.

An object of the present invention, therefore, is to provide an improved frequency meter for producing a direct-current potential in proportion to the frequency of an incoming signal.

Another object is to provide a frequency meter of the type specified, having improved characteristics with respect to sensitivity and efficiency.

A further object is to provide a frequency meter of the type specified wherein the duty cycle is increased to produce an output signal of greater magnitude than has been possible with known frequency meters of this general type.

In a circuit embodying the invention, one of the pulses from the incoming signal voltage is utilized to ionize a suitable gaseous electric discharge device, such as a thyratron tube, and at the same time this pulse is coupled into a time-delay circuit to start a time-delay cycle. A voltage pulse obtained at the end of the time-delay cycle is then utilized in a circuit to deionize the thyratron tube. This produces a square wave signal voltage across a resistor in the thyratron tube circuit, and the resultant successive voltage pulses are then integrated or filtered to produce a direct-current component proportional to the frequency of the incoming signal.

The foregoing and other objects and advantages will become apparent in view of the following description taken in conjunction with the drawings, wherein.

Figure 1:
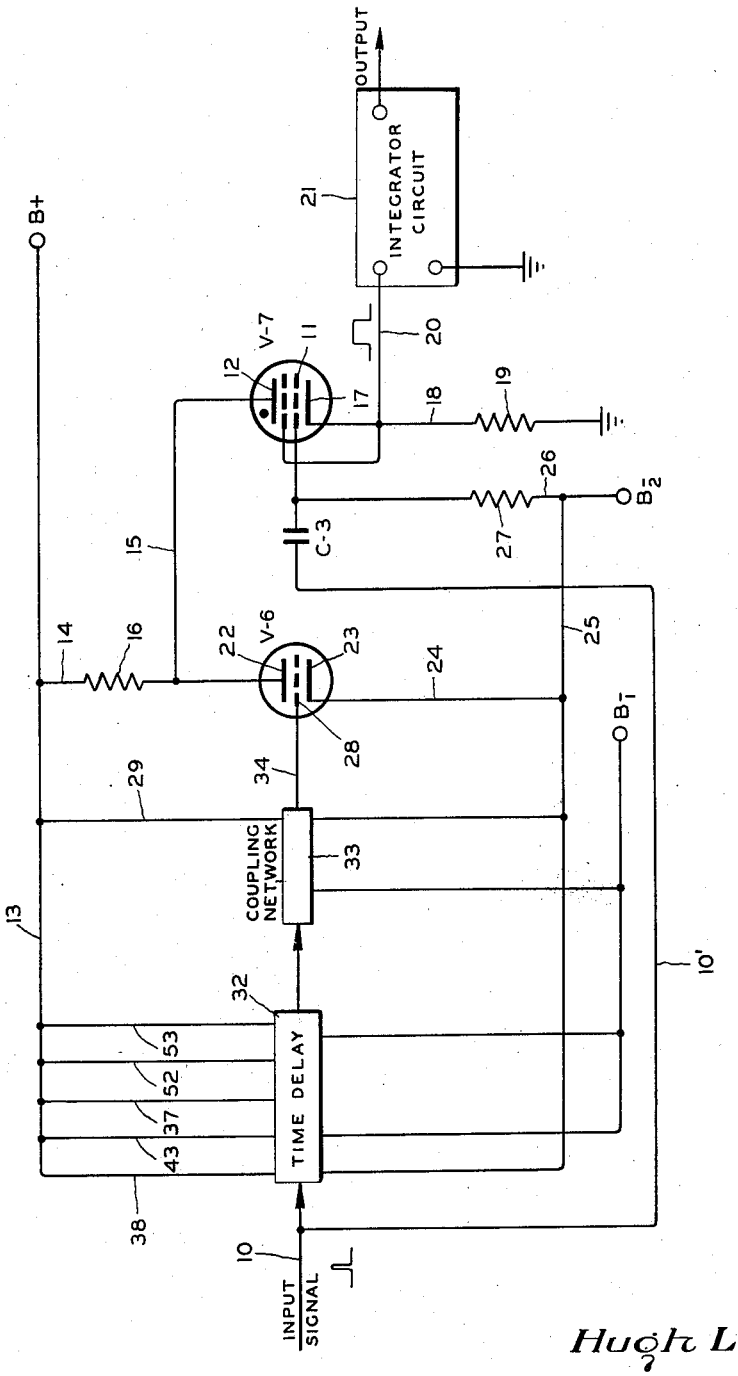
Fig. 1 is a combination block and schematic diagram of a system in accordance with the invention.
Figure 2:
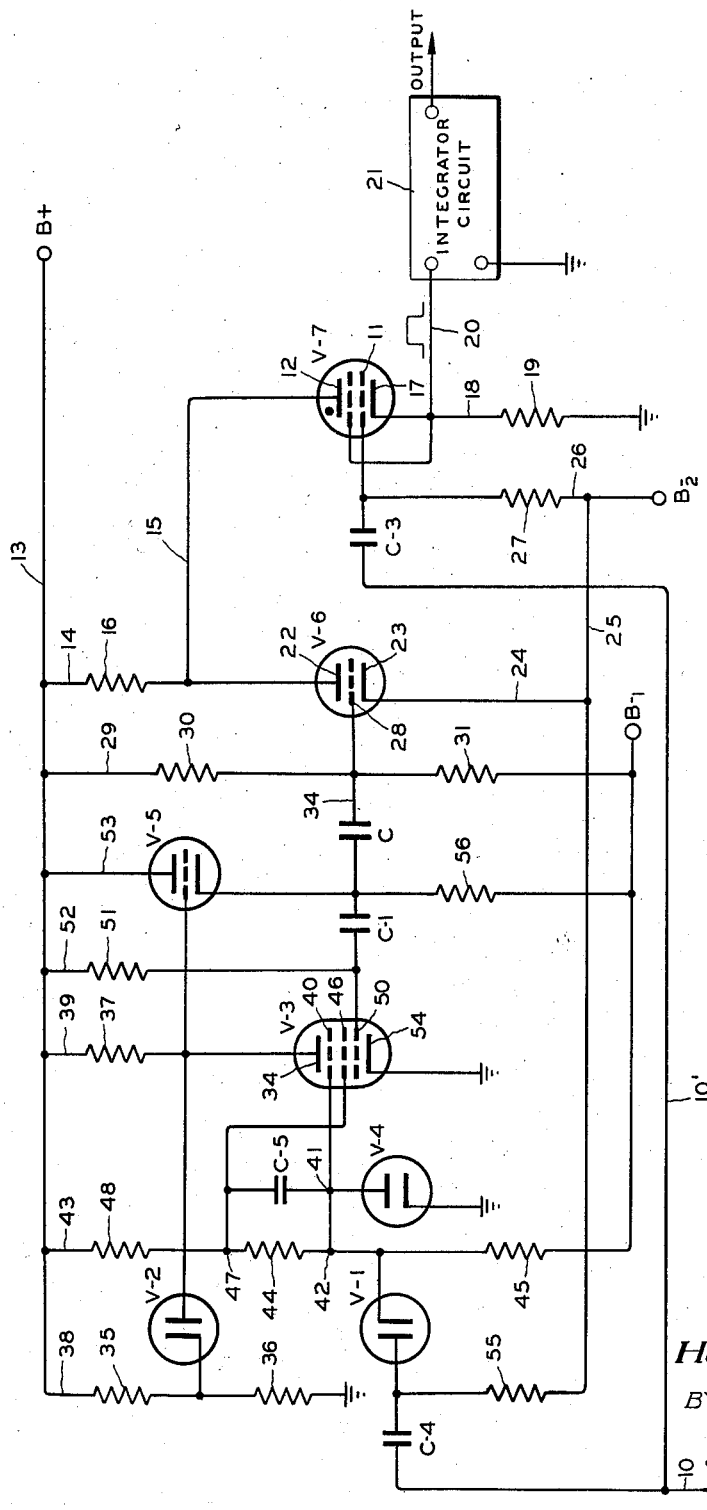
Fig. 2 is a schematic diagram of the complete circuit of Fig. 1.
Figure 3A:
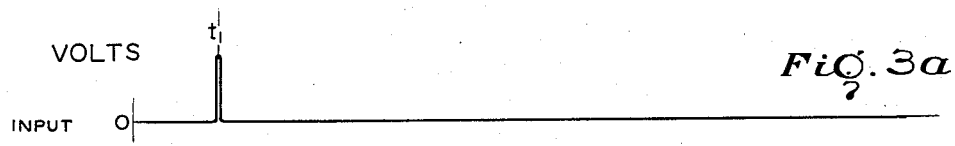
Figs. 3a to 3h are a group of waveforms illustrating the shape of the signals at various points in the circuit of Fig. 2.
Figure 3B:
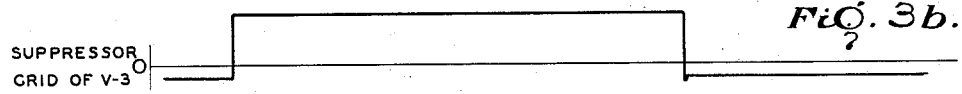
Figure 3C:
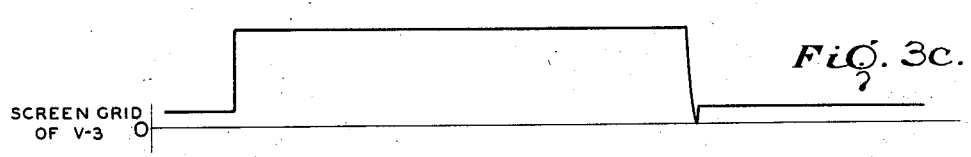
Figure 3D:
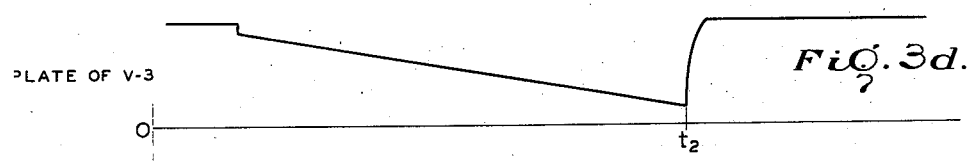
Figure 3E:
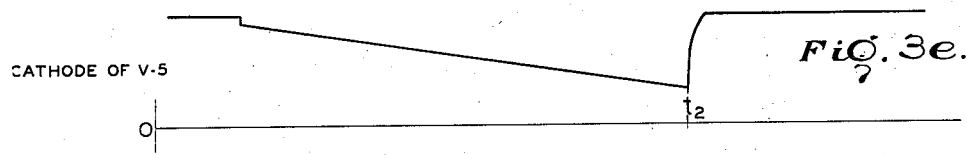
Figure 3F:
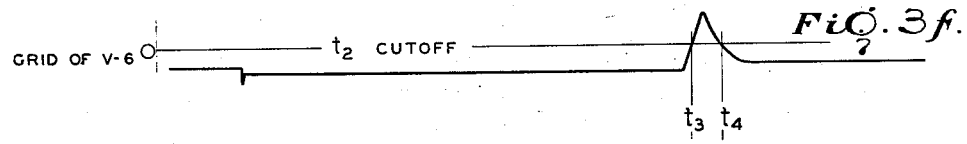
Figure 3G:
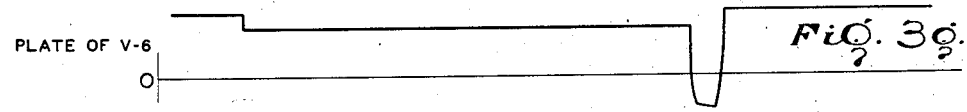
Figure 3H:
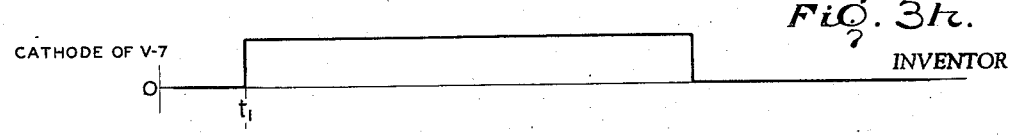

Referring to Fig. 1, an input line is indicated at 10, which may extend from the output section of radio receiving apparatus such as that used to receive signals sent from balloon-borne meteorological telemetering apparatus. The approximate shape of the signal is indicated in Figs. 1, 2 and 3a. A branch line 10' leads off from the input line to the control grid 11 of a gaseous discharge device or thyratron tube V-7, the anode or plate 12 of which is supplied with a regulated B+ voltage by way of line 13 and conductors 14 and 15, the conductor 14 having a resistor 16 therein, the function of which will subsequently be described. The cathode 17 of V-7 is shown connected to ground by way of conductor 18 having a pulse-forming resistor 19 therein; and the output of the frequency meter is from conductor 18 by way of line 20 to an integrating or pulse filter circuit shown in block diagram at 21 and which is not illustrated in detail since its particular construction is not concerned with the present invention.

A deionizing control device in the form of a triode V-6 has its anode or plate 22 connected to the anode 12 of V-7 and its cathode 23 connected to a suitable source of negative voltage, indicated at $B_2-$, by way of conductor 24 and line 25. The grid 11 of V-7 is also connected to $B_2-$ by way of conductor 26 having a current-limiting resistor 27 therein. A coupling capacitor C-3 is inserted in the grid lead section of 10'. The cut-off bias potential on grid 28 of V-6 is maintained at a predetermined value by resistors 30 and 31, which constitute a voltage divider circuit in line 29 between the $B+$ and $B_1-$ supply, see Fig. 2.

The input signals are also coupled into a time-delay circuit, indicated in block diagram in Fig. 1 at 32, the output of which is shaped in a pulse-forming coupling network 33, also shown in block diagram in Fig. 1, which in turn has its output connected by way of conductor 34 to the grid 28 of the tube V-6.

In the absence of an input signal, the thyratron V-7 and deionizing tube V–6 will not be conducting, the grids 11 and 28 of these tubes being biased to cut off. When a positive pulse is applied to the input line 10, the grid 11 of V–7 is swung in a positive direction to a point where ionization takes place, whereupon a flow of direct current will ensue across the tube to ground via conductor 18 and a voltage drop will occur across the resistor 19. The input pulse is also coupled into the time-delay network 32 across capacitor C–4 and coupling diode V–1, where a time-delay cycle is started. The arrangement is such that the output from the pulse-forming network 33 will swing the grid 28 in a positive direction to a point where the tube V–6 will conduct, producing a relatively large voltage drop across the resistor 16 of a polarity and magnitude such as to cause the plate of V–7 to drop below ground potential for a sufficient time to permit V–7 to deionize. The tube V–6 and thyratron V–7 now return to the condition existing prior to the pulse, whereupon the system is ready to accept another input pulse.

The time-delay network shown in block diagram in Fig. 1 at 32 preferably comprises a phantastron circuit (Fig. 2) including main control pentode V–3 and associated diodes V–1, V–2 and V–4, and a feed-back circuit including cathode follower triode V–5; while the coupling network is shown as including a capacitor C and voltage divider 30, 31. In this type of time-delay circuit, direct-current supply voltages B+, $B_1-$ and $B_2-$ of three different values are utilized. $B_1-$ and $B_2-$ establish reference voltage levels below ground with $B_1-$ being of a greater negative potential than $B_2-$.

The tubes V–2 and V–4 are clamping tubes. Prior to the start of a run-down cycle, the plate 34 of V–3 is clamped to a predetermined voltage level by V–2 and resistors 35, 36 and 37 in lines 38 and 39. The resistors 35 and 36 constitute a voltage divider which maintains the cathode bias of V–2 at a value such that the latter will conduct only when the plate 34 of V–3 equals or attempts to exceed such predetermined level. The tube V–4 has its plate connected at 41 to the lead of suppressor grid 40, which lead in turn is connected to terminal 42 in line 43 at the juncture of resistors 44 and 45; while the screen grid 46 of V–3 has its lead connected to terminal 47 in line 42 at the juncture of resistors 44 and 48. The resistors 44, 45 and 48 constitute a voltage divider circuit wherein the relative values of the respective resistors are such that between each input pulse, when the screen grid is conducting, the potential existing on the suppressor grid will be negative with respect to ground. The arrangement is such that the tube V–4 prevents the suppressor grid 40 from becoming sufficiently positive so as to become fixed at that level due to secondary emission from the plate, and said tube also prohibits the suppressor grid from experiencing a large voltage variation, thereby permitting rapid transitions to occur within V–3.

The plate 34 of V–3 is coupled in feed-back relation to the control grid 50 of V–3 via cathode follower V–5 and capacitor C–1. V–5 provides a low-resistance path for the flow of charging current to C–1. Resistor 51 in line 52 coacts with capacitor C–1 to provide the RC timing combination for the feed-back circuit. The plate supply to V–5 is taken from line 13 by way of conductor 53.

Operation

In the following description of the operation of the improved frequency meter, reference may be had to the waveforms of Figs. 3a to 3h, inclusive.

At the time $t_1$, a pulse from the incoming signal causes the thyratron V–7 to ionize, so that a voltage drop is produced across resistor 19. The input signal pulse is also coupled to the suppressor grid 40 of the tube V–3. Prior to the occurrence of an input pulse, or prior to the time $t_1$ in Figs. 3a to 3h, inclusive, the control grid 50 of tube V–3 is slightly positive with respect to the cathode 54, which is connected to ground; and the screen grid 46 is conducting sufficiently to cause the potential existing on the suppressor grid 40 to become negative with respect to ground potential, due to the connection of the latter grid into the voltage divider circuit comprising resistors 48, 44 and 45. Hence no plate current will be flowing, the plate 34 of V–3 being clamped to a predetermined voltage level as heretofore noted. When a positive input pulse is injected, it is coupled via the tube V–1 to the suppressor grid 40 of V–3, whereupon the rise in potential on the suppressor grid will permit plate current to flow in V–3. At this time, the tube V–2 will stop conducting because of the drop in its plate voltage resulting from the voltage drop across the resistor 37 caused by the plate current of V–3 flowing therethrough; also the screen grid current of V–3 will diminish because the attracting force of the plate 34 is now influencing electrons within the tube and hence the voltage level on the screen grid 46 will increase because of the decrease in voltage drop across the resistor 48. The decrease in voltage drop across resistor 48 also produces an increase in the voltage level at the juncture of resistors 44 and 45, or at the terminal 42, so that the suppressor grid 40 will remain slightly above ground potential when the input positive pulse has ceased. Also, at this time, the drop in plate voltage of V–3 will be coupled to the control grid 50 of V–3 via the cathode follower V–5. This may be explained briefly as follows: If the feed-back path through V–5 were open, the plate voltage of V–3 would drop by an amount determined by the circuit parameters. However, as the feed-back path is closed (V–5 being conducting), the drop in plate potential of V–3 is coupled to the control grid 50, which just prior to this time was at a slightly positive voltage level. The effect of the drop on the control grid 50 is to restrict the plate current of V–3, which in turn will reduce the drop in plate voltage to an amount such that the feed-back to the control grid 50 is sufficient to produce the drop. In other words, the loop will stabilize at the time $t_1$ when the control grid potential is sufficient to produce a plate voltage of a value to provide, via the cathode follower V–5, a coordinated control grid potential.

Also, at the time $t_1$ plus, the capacitor C–1 will begin to accumulate a charge via the resistor 51 such that the plate current of the tube V–3 will increase, and this will cause the plate potential of the tube V–3 to decrease. This decrease is coupled to the control grid 50 and partially counteracts the increase in grid voltage. The capacitor C–1 will continue to accumulate a charge through the resistor 51 with the feed-back path controlling the effect of this potential on the plate voltage such that a controlled linear run-down is provided, note the slope in the waveform for the plate 34 of V–3 as the plate current continues to increase after the time $t_1$. As the charge on C–1 continues to increase, the control grid 50 becomes increasingly positive and the drop across the plate 34 continues to increase until the plate current reaches saturation. Several things occur at this time: The screen grid 46 begins to take the excess electrons, and the resultant increase in screen grid current causes an increase in the voltage drop across resistor 48, and this in turn causes the voltage at the junction of resistors 44 and 45 to decrease, which when coupled to the suppressor grid 40 causes the plate current to decrease. Two positive feed-back actions now occur, (a) the partial restriction of the flow of plate current produces additional excess electrons, which in turn lowers the potential on the suppressor grid 40, and (b) restriction of the plate current by the suppressor grid causes the potential of the plate 34 to rise, and this rise is coupled to the control grid. The resultant increased flow of electrons through the control grid increases the number of excess electrons, and this permits the screen grid to conduct at an increased rate, which causes the potential on the suppressor grid to fall at a greater rate. The two positive feedback actions just described rapidly cut off the plate current of V–3, note the sharp rise at $t_2$ in Fig. 3d, and the circuit is returned to the state in which it was prior to the input pulse.

Between the times $t_1$ and $t_2$ the rate of change of potential on the cathode of V–5 was not sufficiently fast to cause any great effect on the grid 28 of V–6. At the time $t_2$, the potential on the cathode of V–5 rises very rapidly, and this rise is coupled to the grid 28 of V–6. The tube V–6 will begin to conduct at the time $t_3$, Fig. 3f, and will cause the potential of the plate of the thyratron V–7 to fall below ground potential. The value of components in the coupling network are so chosen that the RC charging rate will permit a sufficient time to elapse between the times $t_3$ and $t_4$ for V–7 to deionize, whereupon the cathode 17 of V–7 will be returned to ground potential.

By utilizing a phantastron in combination with a thyratron and its associated control circuit in the manner herein disclosed, a relatively long time delay having good consistency is provided which is unaffected to any great extent by variations in tube characteristics. The operational consistency may be improved to within small tolerances through the proper choice of components and power supplies.

The invention may be embodied in other specific forms without departing from the spirit or essential characteristics thereof, the scope of the invention being indicated by the appended claims rather than by the foregoing description and the particular circuitry used for illustrative purposes in the drawings.

What is claimed and desired to be secured by United States Letters Patent is:

1. In a frequency meter, an output pulse-generating circuit including a gas tube having a deionizing control electrode, a cathode and an ionizing control electrode; a time-delay circuit; a deionizing control circuit including an electric discharge device having an output electrode connected to the deionizing control electrode of said gas tube and a control electrode connected to the output of said time-delay circuit, and a meter input circuit arranged to communicate an input signal pulse to the ionizing control electrode of said gas tube and simultaneously couple said input signal into said time-delay circuit to trigger the latter and initiate a time-delay cycle.

2. In a frequency meter, an output pulse-generating circuit including a gas tube having a deionizing control electrode, a cathode and an ionizing control electrode; a time-delay circuit; a deionizing control circuit including an electric discharge device having an anode connected to the deionizing control electrode of said gas tube and a control electrode connected to the output of said time-delay circuit; and a meter input circuit arranged to communicate an input signal pulse to the ionizing control electrode of said gas tube and simultaneously couple said input pulse into said time-delay circuit to trigger the latter and initiate a time-delay cycle, at the termination of which said electric discharge device is rendered operative to lower the potential of the deionizing control electrode of said gas tube.

3. In a frequency meter, an output pulse-generating circuit including a gas tube having a deionizing control electrode, a cathode and an ionizing control electrode; a time-delay circuit; a deionizing control circuit including an electric discharge device having an anode connected in circuit with said deionizing control electrode; a source of supply potential for said anode, a resistor in circuit with said anode and its supply voltage; said electric discharge device also having a control electrode connected to the output of said time-delay circuit, and a meter input circuit arranged to communicate an input signal pulse to the ionizing control electrode of said gas tube and simultaneously couple said input signal into said time-delay circuit to trigger the latter and initiate a time-delay cycle, at the termination of which the control electrode of said electric discharge device is swung into the conducting region to produce a drop across said resistor of a magnitude and polarity such as to lower the potential of said deionizing control electrode to the deionizing value.

4. In a frequency meter, an output pulse-generating circuit including a gas tube having a deionizing control electrode, a cathode and a control grid; a time-delay circuit; a deionizing control circuit including an electric discharge device having an anode connected to the deionizing control electrode of said gas discharge device; a source of supply potential for said anode, a resistor connected in circuit with said anode and its supply voltage, said electric discharge device having a control grid connected to the output of said time-delay circuit, and a meter input circuit arranged to communicate an input firing pulse to the ionizing control electrode of said gas tube and simultaneously couple said input pulse into said time-delay circuit to initiate a time-delay cycle, at the termination of which the grid of said electric discharge device is swung into the conducting region to produce a drop across said resistor of a polarity and magnitude such as to lower the potential of the anode of said gas tube to the deionizing value.

5. In a frequency meter, an output pulse-generating circuit including a gas tube having a deionizing control electrode, a cathode and an ionizing control electrode; a pulse-forming resistor in circuit with said cathode, a time-delay network; a deionizing control circuit including an electric discharge device having an output electrode connected to the deionizing control electrode of said gas tube and a control grid, a pulse-forming network coupling the output of said time-delay network to said control grid, and a meter input circuit arranged to communicate an input signal pulse to the ionizing control electrode of said gas tube and simultaneously couple said input pulse into said time-delay circuit to trigger the latter and initiate a time-delay cycle.

6. In a frequency meter, an output pulse-generating circuit including a gas tube having a deionizing control electrode, a cathode and an ionizing control electrode; a pulse-forming resistor in circuit with said cathode, a time-delay network comprising a phantastron circuit and a pulse-forming coupling network; a deionizing control circuit including an electric discharge device having an output electrode connected to the deionizing control electrode of said gas tube and a control grid connected to said coupling network, and a meter input circuit arranged to communicate an input signal pulse to the ionizing control electrode of said gas tube and simultaneously couple said input pulse into said phantastron circuit to trigger the latter and initiate a rundown cycle.

7. In a frequency meter, an output pulse-generating circuit, an integrator circuit coupled to the output circuit for producing a direct-current potential proportionate to the frequency of the signals received by the meter; said output pulse-generating circuit comprising a gas tube having a deionizing control electrode, an ionizing control electrode and a cathode provided with a circuit having a load resistor therein across which the output pulses are developed; a deionizing control circuit including a vacuum tube having a plate circuit connected to the deionizing control electrode of said gas tube and a control grid; a time-delay network for the input signals; a pulse-forming network coupling the time-delay network to the control grid of said vacuum tube, and a meter input circuit arranged to communicate an input signal pulse to the ionizing control electrode of said gas tube and simultaneously couple said input pulse into said time-delay circuit to trigger the latter and initiate a time-delay cycle, at the termination of which said vacuum tube is rendered conductive to lower the potential of the deionizing control electrode of said gas tube to the deionizing value.

References Cited in the file of this patent

UNITED STATES PATENTS

| | | |
|---|---|---|
| 2,096,982 | Schlesinger | Oct. 26, 1937 |
| 2,402,372 | Compton | June 18, 1946 |
| 2,481,925 | Hegbar | Sept. 13, 1949 |
| 2,534,856 | Craft | Dec. 19, 1950 |
| 2,707,250 | Hoover | Apr. 26, 1955 |